United States Patent
Ma et al.

(10) Patent No.: US 7,583,677 B1
(45) Date of Patent: *Sep. 1, 2009

(54) DYNAMIC FLOW-BASED MULTI-PATH LOAD BALANCING WITH QUALITY OF SERVICE ASSURANCES

(75) Inventors: Qingming Ma, Sunnyvale, CA (US); Anupam A. Bharali, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 456 days.

This patent is subject to a terminal disclaimer.

(21) Appl. No.: 11/556,498

(22) Filed: Nov. 3, 2006

(51) Int. Cl.
*G06F 11/00* (2006.01)
*H04L 12/28* (2006.01)
*H04J 3/22* (2006.01)

(52) U.S. Cl. .................. 370/395.21; 370/235; 370/471

(58) Field of Classification Search ......... 370/229–240, 370/252, 351, 400, 471
See application file for complete search history.

(56) References Cited

U.S. PATENT DOCUMENTS

| | | | | |
|---|---|---|---|---|
| 5,548,639 | A * | 8/1996 | Ogura et al. ........... | 379/221.04 |
| 6,301,244 | B1 * | 10/2001 | Huang et al. ................ | 370/351 |
| 6,532,212 | B1 * | 3/2003 | Soloway et al. ............. | 370/230 |
| 6,690,671 | B1 * | 2/2004 | Anbiah et al. ........... | 370/395.43 |
| 6,778,498 | B2 * | 8/2004 | McDysan ................... | 370/231 |
| 6,940,853 | B2 * | 9/2005 | Yamada et al. ............... | 370/389 |
| 7,130,268 | B2 * | 10/2006 | Mascolo ..................... | 370/232 |
| 7,266,079 | B2 * | 9/2007 | Fan ............................. | 370/235 |
| 7,330,436 | B2 * | 2/2008 | Fabre et al. .............. | 370/238.1 |
| 7,346,056 | B2 * | 3/2008 | Devi .......................... | 370/392 |
| 2002/0141345 | A1 * | 10/2002 | Szviatovszki et al. ....... | 370/238 |
| 2006/0182082 | A1 * | 8/2006 | Wakumoto et al. .......... | 370/351 |
| 2006/0221974 | A1 * | 10/2006 | Hilla et al. ................... | 370/394 |
| 2007/0002748 | A1 * | 1/2007 | Nakata et al. ............... | 370/238 |
| 2007/0025252 | A1 * | 2/2007 | McGee et al. ............... | 370/235 |
| 2007/0047446 | A1 * | 3/2007 | Dalal et al. ................. | 370/237 |
| 2007/0140114 | A1 * | 6/2007 | Mosko ....................... | 370/229 |
| 2008/0056122 | A1 * | 3/2008 | Madhi et al. ................. | 370/216 |

OTHER PUBLICATIONS

XRoads Networks, Inc., Traffic Shaping Overview, Revision 3.3.1, Apr. 2006, 12 pgs.

* cited by examiner

*Primary Examiner*—Chi H Pham
*Assistant Examiner*—Warner Wong
(74) *Attorney, Agent, or Firm*—Shumaker & Sieffert, P.A

(57) ABSTRACT

In general, the invention is directed to techniques of dynamically balancing network traffic load among multiple paths through a computer network. The techniques distribute and redistribute flows of network packets between different paths based on dynamically measured path bandwidth and loads of each flow. In distributing the flows, Quality of Service (QoS) bandwidth requirements of the flows may be maintained.

36 Claims, 8 Drawing Sheets

DYNAMIC FLOW-BASED MULTI-PATH LOAD BALANCING WITH QUALITY OF SERVICE ASSURANCES

TECHNICAL FIELD

The invention relates to computer networks and, in particular, to load balancing in computer networks.

BACKGROUND

A computer network is composed of nodes connected by links. Between any two nodes in a computer network, there may be one or more paths. Thus, a message traveling through the computer network from a first node to a second node may traverse the computer network through one of several possible paths. For instance, the message may travel over a dedicated path between the first and the second nodes. Alternatively, the message may travel over a virtual private network (VPN) path through a public network.

Each path in a computer network is associated with a particular bandwidth. In general, the bandwidth of a path is a measure of how many messages may travel through the path in a given period of time. The bandwidth of a path may change over time. For instance, the bandwidth of a path may decrease if a router along the path becomes excessively overloaded, there is electrical interference along the path, and so on.

Some applications have minimum Quality of Service (QoS) bandwidth requirements when communicating over a computer network. For instance, a Voice over Internet Protocol (VoIP) application may require that its network packets be granted a minimum amount of bandwidth in order to assure high voice quality. To provide QoS requirements, a node may prioritize network packets of applications having QoS requirements when the node transmits those network packets.

SUMMARY

In general, the invention is directed to techniques of dynamically balancing network traffic load among multiple paths through a computer network. The techniques distribute and redistribute flows of network packets between different paths based on dynamically measured path bandwidth and loads of each flow. In distributing the flows, Quality of Service (QoS) requirements of the flows may be maintained.

For example, several paths may connect a first edge router and a geographically-separated second edge router. When the first edge router receives flows of network packets to be sent through the second edge router, the first edge router may automatically balance these flows across the several paths while assuring that Quality of Service (QoS) requirements of the flows are maintained.

In one embodiment, a method comprises dynamically assigning incoming flows of network packets to network paths in a plurality of network paths to a destination. The incoming flows of network packets are assigned such that the network paths have sufficient available bandwidth to satisfy QoS bandwidth requirements associated with the incoming flows. In addition, the incoming flows are load balanced among the network paths. The method also comprises forwarding the network packets of the incoming flows to the destination via the assigned network paths, such that the QoS requirement of the incoming flow is satisfied. In addition, the method requires selecting a flow assigned to one of the network paths when the network path does not have sufficient available bandwidth to satisfy a QoS bandwidth requirement of a flow assigned to the network path. The method also requires un-assigning the selected flow from the network paths.

In another embodiment, a network device comprises an initial load balancer to dynamically assign incoming flows of network packets to network paths in a plurality of network paths to a destination. The initial load balancer assigns the incoming flows such that the network paths have sufficient available bandwidth to satisfy QoS bandwidth requirements associated with the incoming flows and such that the incoming flows are load balanced among the network paths. The network device also comprises a load rebalancer to select a flow assigned to one of the network paths when the network path does not have sufficient available bandwidth to satisfy a QoS bandwidth requirement of a flow assigned to the network path and to un-assign the selected flow from the network path. In addition, the network device comprises a packet scheduler to send the network packets of the incoming flow to the destination via the assigned network path, such that the QoS requirement of the flow is satisfied.

In another embodiment, a computer-readable medium comprises instructions. The instructions cause a programmable processor of a network device to dynamically assign incoming flows of network packets to network paths in a plurality of network paths to a destination. The incoming flows of network packets are assigned such that the network paths have sufficient available bandwidth to satisfy QoS bandwidth requirements associated with the incoming flows and such that the incoming flows are load balanced among the network paths. The instructions also cause the processor to forward the network packets of the incoming flows to the destination via the assigned network paths, such that the QoS requirements of the incoming flows are satisfied. In addition, the instructions cause the processor to select a flow assigned to one of the network paths when the network path does not have sufficient available bandwidth to satisfy a QoS requirement associated with a flow assigned to the network path. The instructions also cause the processor to un-assign the selected flow from the network paths.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
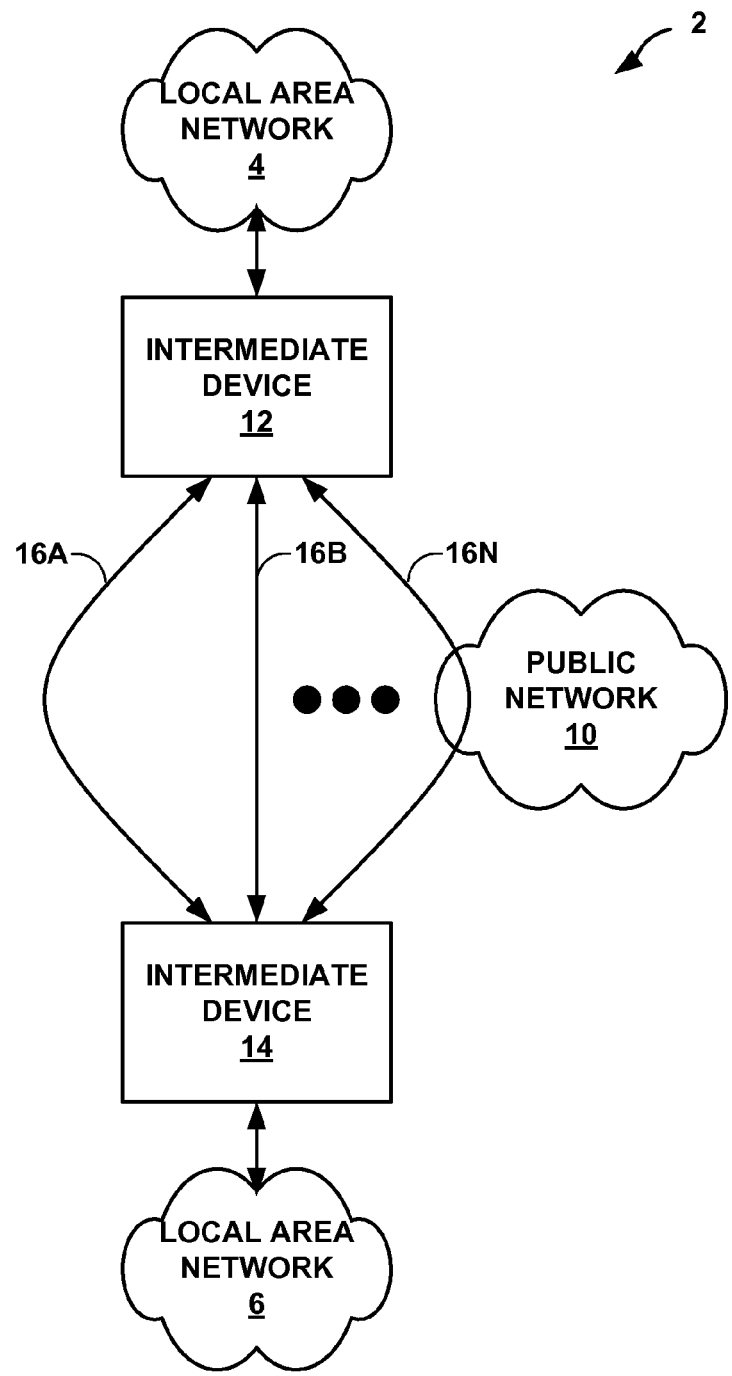
FIG. 1 is a block diagram illustrating an exemplary computer network system implementing certain embodiments of the invention.

FIG. 1 is a block diagram illustrating an exemplary computer network system 2. In this example, system 2 includes a first local area network ("LAN") 4, and a second LAN 6. LAN 4 and LAN 6 may each represent a local Ethernet network within a respective corporate office, where the corporate offices are geographically remote from each other. Various network devices (e.g., servers, personal computers, set top boxes, wireless devices, intermediate network devices, network appliances, etc.) in an office may be communicatively connected to LAN 4 or LAN 6.

Paths 16A through 16N (collectively, paths 16) represent network paths that facilitate communication between LAN 4 and LAN 6. Generally, some of paths 16 may traverse public networks, while other ones of paths 16 traverse private networks. As illustrated in the example of FIG. 1, path 16N traverses public network 10. For instance, path 16N may be a secure virtual private network ("VPN") connection tunneled through a public network 10, such as the Internet. In contrast, path 16A and path 16B are shown outside public network 10, and may be part of a private network associated with the enterprise to which LAN 4 and LAN 6 below. For instance, paths 16A and 16B may traverse one or more dedicated leased lines between intermediate device 12 and intermediate device 14.

An intermediate device 12 controls communication between LAN 4 and paths 16, i.e., network traffic flowing into or out of LAN 4. Similarly, an intermediate device 14 controls communication between LAN 6 and paths 16, i.e., network traffic flowing into or out of LAN 6.

When a network device on LAN 4 outputs a communication destined for a network device on LAN 6, a flow of one or more network packets addressed to the receiving network device on LAN 6 arrive at intermediate device 12. In response, intermediate device 12 selects one of paths 16 and forwards the network traffic to intermediate device 14. In order to reduce the delay associated with communicating the network packets to intermediate device 14, intermediate device 12 may distribute the network packets among paths 16. That is, intermediate device 12 automatically "load balances" outbound flows of network packets among paths 16.

In one embodiment, intermediate device 12 monitors network paths 16 and dynamically determines an available bandwidth for each of network paths 16. When intermediate device 12 receives a new network flow from LAN 4, intermediate device 12 uses this available bandwidth information to assign the new network flow to one of paths 16. After assigning the new network flow to one of paths 16, intermediate device 12 sends the network packets of the network flow to intermediate device 14 via the assigned network path. Intermediate device 12 continues to send network packets of the new network flow on the path assigned to the flow until the network flow ceases or the network flow is reassigned.

Certain classes of applications running on network devices in LAN 4 may require a certain minimum quality of service (QoS) bandwidth requirements when communicating with devices in LAN 6. In other words, an application may require that a certain minimum amount of bandwidth be available for communications with devices in LAN 6 in order for acceptable performance of the application. For example, an Internet telephony application (e.g., a Voice over Internet Protocol enabled device) may require that a minimum amount of bandwidth be available in order to assure adequate voice quality. Intermediate device 12 assigns incoming flows to paths 16 when paths 16 have sufficient available bandwidth to satisfy the QoS bandwidth requirements associated with the flows and such that the flows are load balanced among paths 16.

Intermediate device 12 may be configured to operate in a first mode, referred to as a "prioritized" multi-path configuration. In the prioritized multi-path configuration, each of paths 16 is associated with a well-ordered priority. That is, each of paths 16 may be ranked in an order, such as a primary path, a secondary path, and so on. For example, if path 16A has greatest bandwidth and the greatest reliability, path 16A may be associated with the highest-priority. In one embodiment, when intermediate device 12 receives a new flow from LAN 4, intermediate device 12 assigns the new flow the highest priority path unless congestion or QoS considerations dictate otherwise, as described in further detail below.

In addition, intermediate device 12 may be configured to operate in a second mode, referred to as a symmetric multi-path configuration, in which each of paths 16 are viewed as having the same priority. Because in this mode each of paths 16 are viewed as having the same priority, intermediate device 12 may assign incoming network flow to the network path when the network path has less load, proportionally, than other network paths in the plurality of paths. In this way, intermediate device 12 attempts to distribute network flows across each of paths 16 in proportion to the available bandwidth of each of paths 16.

For both multi-path configurations, i.e., both modes, intermediate device 12 may rebalance the load when actual traffic load exceeds the measured available bandwidth for one of paths 16. Actual traffic load may exceed the measured available bandwidth for one of paths 16, for example, because the load in a given flow may increase or decrease after intermediate device 12 assigns the flow to a path. To rebalance the load, intermediate device 12 may reassign one or more flows to a different one of paths 16. In addition, intermediate device 12 may reassign a flow of a QoS class when a path includes a concentration of flows of the QoS class that is not in proportion with the bandwidth of the path.

The techniques of this invention may provide several advantages. For example, intermediate device 12 may automatically balance loads across multiple paths while maintaining quality of service requirements for individual flows. In addition, intermediate device 12 may perform such load balancing over paths that traverse both public and private networks. Furthermore, intermediate device 12 may be configured to support both symmetric and prioritized paths. These properties may allow an individual or enterprise using intermediate device 12 to easily adapt to changes in available bandwidth between two locations, while maintaining QoS requirements for certain applications.

Figure 2:
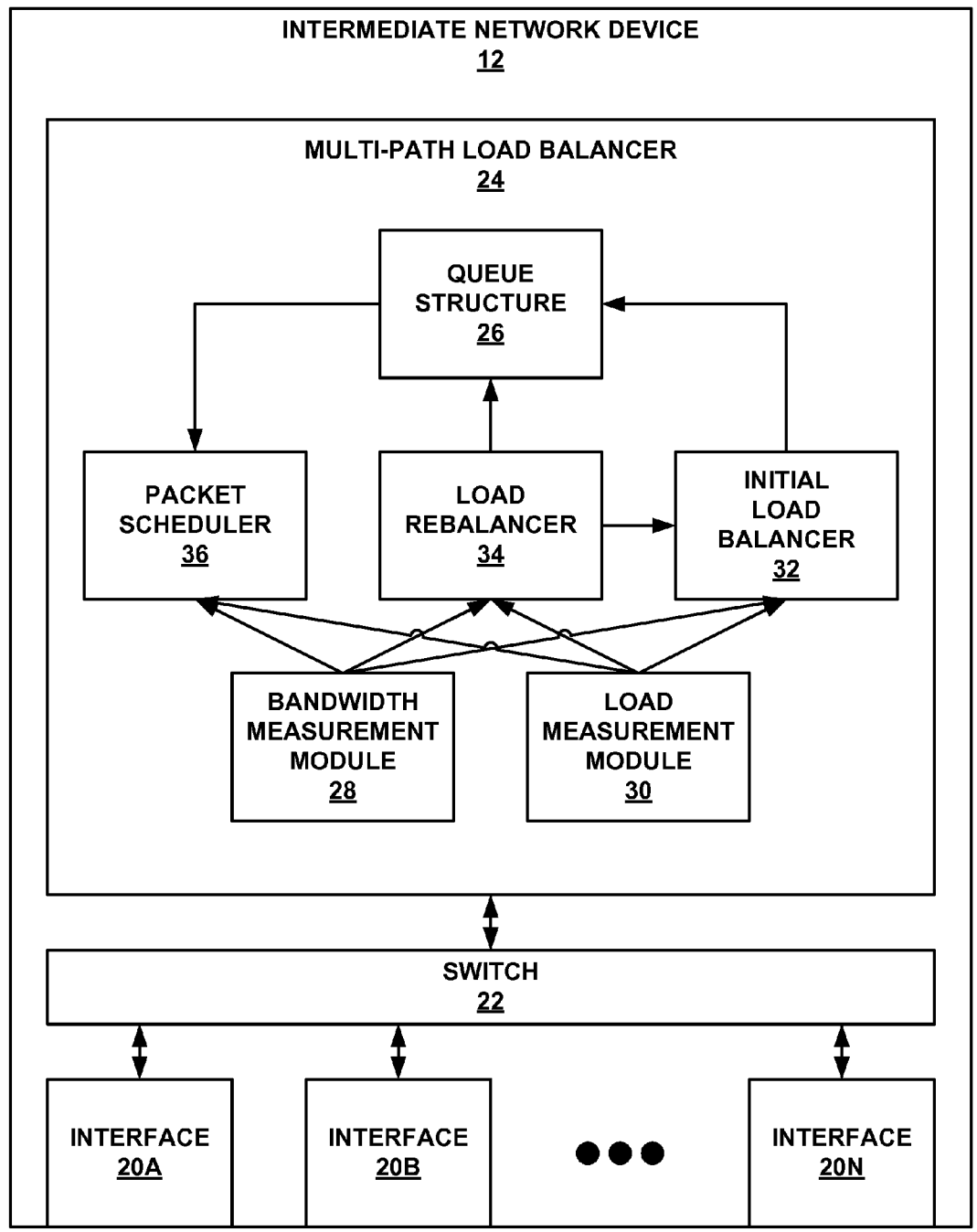
FIG. 2 is a block diagram illustrating an exemplary network acceleration device implementing embodiments of the invention.

FIG. 2 is a block diagram illustrating an exemplary embodiment of intermediate device 12. For purposes of explanation, continuing reference may be made to FIG. 1. In the exemplary embodiment shown in FIG. 2, intermediate device 12 comprises a plurality of network interfaces 20A through 20N (collectively, network interfaces 20), a high speed switch 22, and a multi-path load balancer ("MPLB") 24. Possible implementations of switch 22 may include software or hardware implementations.

Network interfaces 20 receive and send network packets on a computer network. For example, network interface 20A may receive and send network packets on LAN 4. In addition, one or more of network interfaces 20 may receive and send network packets on paths 16. For instance, network interface 20B may receive and send network packets on public network 10. Thus, if two multi-paths traverse public network 10, network interface 20B may receive and send network packets from and to both of those multi-paths.

When one of network interfaces 20 receives a network packet containing a destination address of a network device in LAN 6, the network interface forwards the network packet to MPLB 24 via switch 22 so that MPLB 24 may assign the network packet to one of multi-paths 16.

In this exemplary embodiment, MPLB 24 includes several components, which may be executable software instructions and/or data structures within an operating environment provided by one or more processors of network device 12. In this example, MPLB 24 includes a queue structure 26, a bandwidth measurement module 28, a load measurement module 30, an initial load balancer 32, a load rebalancer 34 (which is shown as a separate module merely for ease illustration and may be implemented by load balancer 32), and a packet scheduler 36.

Bandwidth measurement module 28 measures available bandwidth for each of multi-paths 16. For example, bandwidth measurement module 28 may send bandwidth discovery packets to intermediate device 14 through each of multi-paths 16. Alternatively, bandwidth measurement module 28 may use a congestion control algorithm such as Transmission Control Protocol (TCP) Vegas to measure maximum available bandwidth for each of paths 16.

Load measurement module 30 measures the load of each flow that intermediate device 12 is sending through paths 16. In particular, load measurement module 30 may calculate an exponential moving average of the load for each of the flows. By using an exponential moving average of the load for each of the flows, load measurement module 30 considers the past load of each flow and the current load of each flow. Using an exponential moving average may balance out short-term spikes or drops in volume for a flow.

Queue structure 26 is a hierarchy of network packet queues. For each active destination, queue structure 26 contains a destination queue. A destination queue contains all network packets awaiting transmission to the destination. Network packets within a destination queue are further classified into one or more other types of queues. How the network packets are further classified depends on whether QoS is enabled on MPLB 24.

If QoS is enabled on MPLB 24, network packets within a destination queue are further classified into path queues. A path queue contains all network packets awaiting transmission to the destination via a particular network path (e.g., one of multi-paths 16). In addition, network packets within a path queue are further classified into QoS class queues. A QoS class queue contains all network packets awaiting transmission to the destination via a particular network path that belong to a particular QoS class. Finally, network packets within a QoS class queue are further classified into flow queues. A flow queue contains all network packets awaiting transmission to the destination via a particular network path that belong to a particular QoS class and belong to a particular flow.

If QoS is not enabled, network packets within a destination queue are classified into path queues. However, network packets are not further classified into QoS class queues. Rather, network packets in a path queue are classified into flow queues. Thus, when QoS is not enabled, a flow queue contains all network packets awaiting transmission to the destination via a particular network path that belong to a particular flow. In some embodiments, this could merely be the special case when all flows belong to a QoS class with no minimum bandwidth requirement.

Initial load balancer 32 receives new network packets, identifies the new network packets as members of flows, and assigns flows to appropriate ones of paths 16. When initial load balancer 32 receives a new network packet, initial load balancer 32 extracts flow information from the new network packet. For example, initial load balancer 32 may extract source and destination addresses, port numbers, application information, and so on from the new network packet. After extracting the flow information, initial load balancer 32 checks whether queue structure 26 contains a flow queue with flow information that matches the extracted flow information. If so, initial load balancer 32 inserts the new network packet into that flow queue. On the other hand, if queue structure 26 does not contain a flow queue with flow information that matches the extracted flow information, initial load balancer 32 creates a new flow queue within queue structure 32. How initial load balancer 32 creates a new flow queue within queue structure 32 may depend on whether MPLB 24 is configured with prioritized or symmetric multi-paths and whether QoS is enabled.

When MPLB 24 is configured with prioritized multi-paths and QoS is not enabled, initial load balancer 32 assigns a new flow to the primary (i.e., highest-priority) path unless initial load balancer 32 detects congestion in the primary path. In particular, initial load balancer 32 creates a new flow queue for the new flow within the path queue for the primary path in queue structure 26. Thereafter, the new flow queue contains all network packets awaiting transmission to device 14 via the primary path that belong to the new flow. Subsequently, initial load balancer 32 inserts network packets in the new flow into the flow queue in queue structure 26 for transmission through one of paths 16 to device 14. On the other hand, if the primary path is congested, initial load balancer 32 assigns the new flow to the secondary (i.e., second highest priority) path unless the secondary path is congested. If the secondary path is congested, initial load balancer 32 assigns the new flow to the tertiary (i.e., third highest priority) path, unless the tertiary path is congested, and so on.

Initial load balancer 32 may "detect congestion" in a path when the total of load measurements and QoS bandwidth requirements for flows on the path exceeds the maximum available bandwidth for the path. As discussed above, bandwidth measurement module 28 generates the data on the maximum available bandwidth and load measurement module 30 generates the data on the load measurements.

As before, when MPLB 24 is configured with prioritized multi-paths and QoS is enabled, initial load balancer 32 assigns a new flow to the primary path unless initial load balancer 32 detects congestion in the primary path. However, because QoS is enabled, initial load balancer 32 identifies a QoS class for the new flow. After identifying the QoS class for the new flow and after determining that the primary path is not congested, initial load balancer 32 creates a new flow queue for the new flow within a QoS class queue for the identified QoS class. This QoS class queue is within a path queue for the primary path in queue structure 26. Thereafter, the new flow queue contains all network packets awaiting transmission to device 14 via the primary path that belong to a QoS class and belong to the new flow.

If MPLB 24 is configured with prioritized multi-paths and QoS is enabled and initial load balancer 32 detects congestion in the primary path, initial load balancer 32 may reassign one or more network flow queues. In particular, initial load balancer 32 identifies QoS class queues within the primary path queue having lower priority than the QoS class of the new flow.

If initial load balancer 32 is unable to identify any QoS class queues within the primary path queue having lower priority than the QoS class of the new flow, initial load balancer 32 attempts to identify any QoS class queues within the secondary path queue having lower priority than the QoS class of the new flow. If the secondary path is congested and initial load balancer 32 is unable to identify any lower QoS class queues in the secondary path, initial load balancer 32 continues this process with lower priority paths.

On the other hand, if initial load balancer 32 is able to identify a QoS class queue that has lower priority than the QoS class of the new flow, initial load balancer 32 may select and remove one or more flow queues from the lower-priority QoS class queue. After removing these flow queues from the lower-priority QoS class queue, initial load balancer 32 may treat network packets belonging to the removed flow queues as belonging to new flows.

If MPLB 24 is configured with symmetric multi-paths and QoS is not enabled, initial load balancer 32 assigns the new flow to the one of paths 16 that is least loaded in proportion to the bandwidth of the path. In particular, initial load balancer 32 uses data from bandwidth measurement module 28 and load measurement module 30 to identify which of paths 16 currently has the maximum available bandwidth. Initial load balancer 32 then creates a new flow queue for the new flow in the path queue of the identified path.

If MPLB 24 is configured with symmetric multi-paths and QoS is enabled, initial load balancer 32 also assigns the new flow to the one of paths 16 that is least loaded in proportion to the bandwidth of the path. However, because QoS is enabled, QoS class is part of the flow information for the current packet. Initial load balancer 32 then creates a new flow queue for the new flow in the QoS class queue of the path queue of the path that has the least load, in proportion to the bandwidth of the path, caused by packets in the same QoS class as the QoS class of the new flow. In this way, initial load balancer 32 distributes flows of a QoS class among paths 16 in proportion to the bandwidths of paths 16.

Load rebalancer 34 reassigns network flows among the path queues of queue structure 26 when one or more of paths 16 become congested. Like initial load balancer 32, the behavior of load rebalancer 34 may depend on whether MPLB 24 is configured with prioritized or symmetric multi-paths and whether QoS is enabled.

If MPLB 24 is configured with prioritized multi-paths and QoS is not enabled, load rebalancer 34 reassigns flows when one of paths 16 becomes congested and when one of paths 16 is not congested. In particular, load rebalancer 34 selects a flow from the congested path. Load rebalancer 34 then removes all of the network packets in a flow queue of the selected flow and deletes the flow queue of the selected flow from queue structure 26. Next, load rebalancer 34 sends these removed network packets to initial load balancer 32. Because these network packets do not belong to a flow queue in queue structure 26, initial load balancer 32 regards these network packets as network packets belonging to a new flow. Accordingly, initial load balancer 32 assigns these and subsequent network packets to an appropriate path queue.

If MPLB 24 is configured with prioritized multi-paths and QoS is enabled, load rebalancer 34 is triggered when one of paths 16 becomes congested. If a higher-priority path is less congested than the congested path, load rebalancer 34 may reassign one or more flows of the highest-priority QoS class in the congested path to the less congested, higher-priority path. In particular, load rebalancer 34 may remove the network packets of these flows from queue structure 26 and supply these network packets to initial load balancer 28 to be treated as a new flow. As a result, initial load balancer 32 automatically assigns these network packets to the less congested, higher-priority path. If no higher-priority path is less congested than the congested path, but there is a lower-priority path that is less congested than the congested path, load rebalancer 34 may reassign one or more flows of the lowest priority QoS class in the congested flow to the less congested, lower-priority path. In particular, load rebalancer 34 may remove the network packets of a flow in the lowest priority QoS class in the congested flow and delete the flow queue from queue structure 26. Load rebalancer 34 may then supply these removed network packets to initial load balancer 32. Because initial load balancer 32 treats these removed network packets as packets belonging to a new flow, initial load balancer 32 automatically assigns these network packets to the less congested, lower-priority path.

If MPLB 24 is configured with symmetric multi-paths and QoS is not enabled, load rebalancer 34 is triggered when one of paths 16 becomes congested. When load rebalancer 34 detects that one of paths 16 is congested, load rebalancer 34 selects one or more flows from the congested path. Load rebalancer 34 then removes the network packets in the path queues of the selected flows and deletes the paths queues of the selected flows. Next load rebalancer 34 provides the removed network packets to initial load balancer 32 as new network packets.

If MPLB 24 is configured with symmetric multi-paths and QoS is enabled, load rebalancer 34 may be triggered in two situations. First, load rebalancer 34 may be triggered when one of paths 16 becomes congested. In this first situation, load rebalancer 34 may behave in the same manner as when MPLB 24 is not configured to support QoS. Second, load rebalancer 34 may be triggered when a path includes a concentration of flows of a QoS class that is not in proportion with the bandwidth of the path. In this second situation, load rebalancer 34 selects one or more flows in the concentrated QoS class. Load rebalancer 34 then removes the network packets in the flow queues of the selected flows and deletes the flow queues of the selected flows from queue structure 26. Load rebalancer 34 then provides the removed network packets to initial load balancer 32 as new packets. Load rebalancer 34 continues to reassign flows in this way until the aggregate arrival rate for the QoS class over each of paths 16 is proportional to the path available bandwidth for each of paths 16.

Packet scheduler 36 selects packets in queue structure 26 for transmission. When MPLB 24 is configured with prioritized multi-paths and QoS is not enabled, packet scheduler 36 selects and sends network packets in path queues in proportion to the measured bandwidth of each of multi-paths 16.

When MPLB 24 is configured with prioritized multi-paths and QoS is enabled, packet scheduler 36 selects and sends network packets in flows within the primary path queue until packet scheduler 36 cannot send any more packets on the primary path. When packet scheduler 36 cannot send any more packets on the primary path, packet scheduler 36 selects and sends network packets in flows within the secondary path queue until packet scheduler 36 can send a packet on the primary path or cannot send any more packets on the secondary path. This pattern continues for other lower-priority paths.

When MPLB 24 is configured with symmetric multi-paths, packet scheduler 36 selects and sends network packets in flow queues within path queues in proportion to the measured bandwidth of each of paths 16. In selecting the network packets, packet scheduler 36 selects packets such that the QoS requirements of the flows are maintained.

Figure 3:
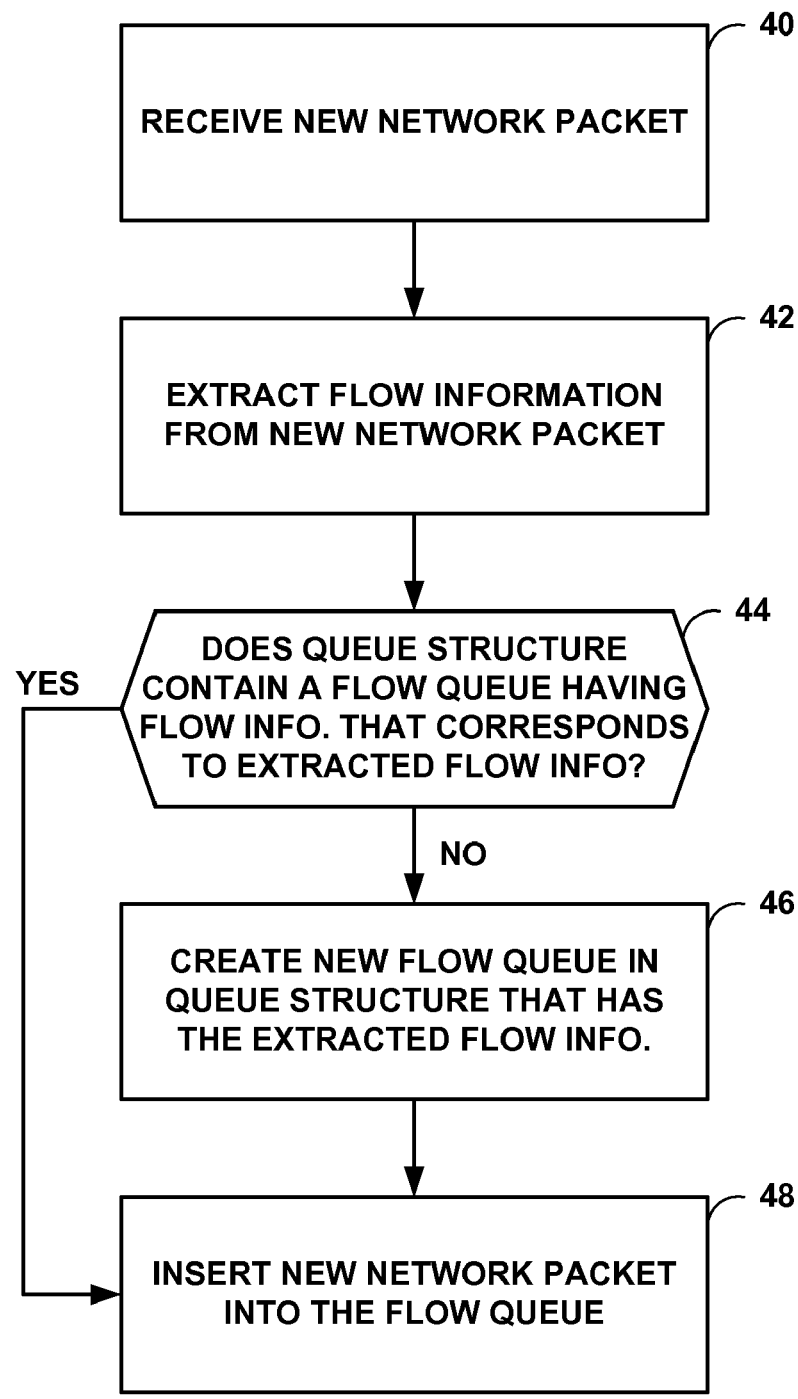
FIG. 3 is a flowchart illustrating an exemplary general operation of an initial load balancer.

FIG. 3 is a flowchart illustrating an exemplary general operation of initial load balancer 32. Initial load balancer 32 is triggered when intermediate network device 12 receives a network packet (40). As described above, initial load balancer 32 may receive a network packet from network interfaces 20 or from load rebalancer 34.

After receiving a new network packet, initial load balancer 32 extracts flow information from the new network packet (42). Using the extracted flow information, initial load balancer 32 determines whether queue structure 26 contains a flow queue having flow information that corresponds to the extracted flow information (44).

If initial load balancer 32 determines that queue structure 26 contains a flow queue having flow information that corresponds to the extracted flow information ("YES" of 44), initial load balancer 32 inserts the new network packet into this flow queue (48).

On the other hand, if initial load balancer 32 determines that queue structure 26 does not contain a flow queue having flow information that corresponds to the extracted flow information ("NO" of 44), initial load balancer 32 creates a new flow queue in queue structure 26 that has the extracted flow information (46). As described above and in the following flowcharts, how initial load balancer 32 creates the new flow queue depends on whether MPLB 24 is configured with prioritized or symmetric multi-paths and whether QoS is enabled. After initial load balancer 32 creates a new flow queue in queue structure 26, initial load balancer 32 inserts the new network packet into this flow queue (48).

Figure 4:
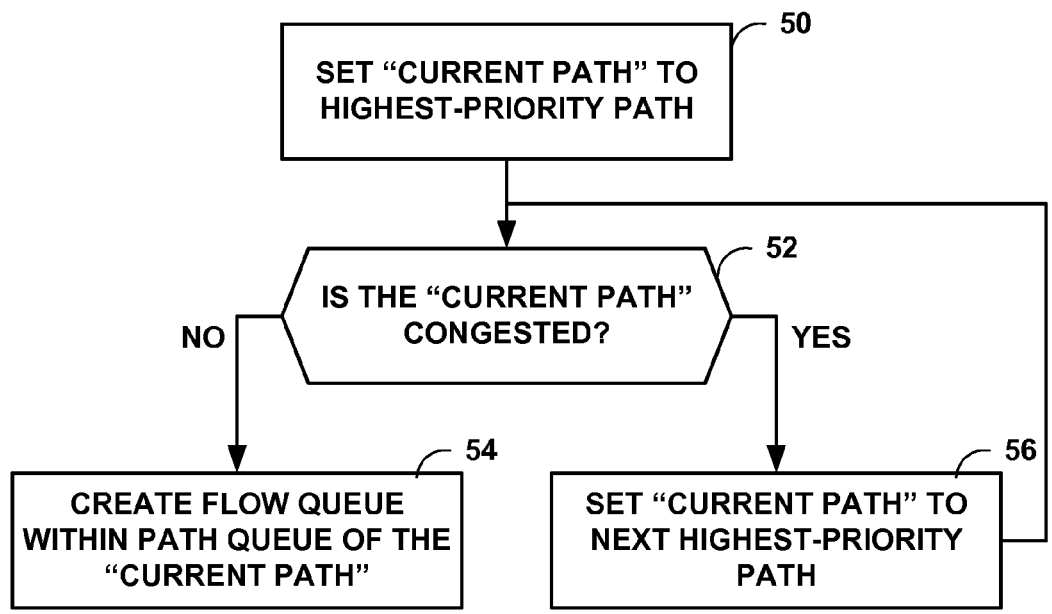
FIG. 4 is a flowchart illustrating an exemplary queue creation operation of an initial load balancer when a Multi-Path Load Balancer (MPLB) is configured with prioritized multi-paths and Quality of Service (QoS) is not configured.

FIG. 4 is a flowchart illustrating an exemplary queue creation operation of initial load balancer 32 when MPLB 24 is configured with prioritized multi-paths and QoS is not enabled. In terms of FIG. 3, FIG. 4 represents an exemplary operation of initial load balancer 32 in step (46) when MPLB 24 is configured with prioritized multi-paths and QoS is not enabled.

Initial load balancer 32 starts this process by setting the "current path" to the highest-priority one of paths 16 (i.e., the primary path) (50). Initial load balancer 32 then determines whether the "current path" is congested (52). If the "current path" is not congested ("NO" of 52), initial load balancer 32 creates a new flow queue within the path queue of the "current path" (i.e., the primary path). If the "current path" is congested ("YES" of 52), initial load balancer 32 sets the "current path" to the next highest-priority path (54). For example, if the "current path" was the primary path, initial load balancer 32 sets the "current path" to the secondary path. After setting the "current path" to the next highest-priority path, initial load balancer 32 determines whether the "current path" is congested (52). This may continue until initial load balancer 32 finds a path that is not congested.

Figure 5:
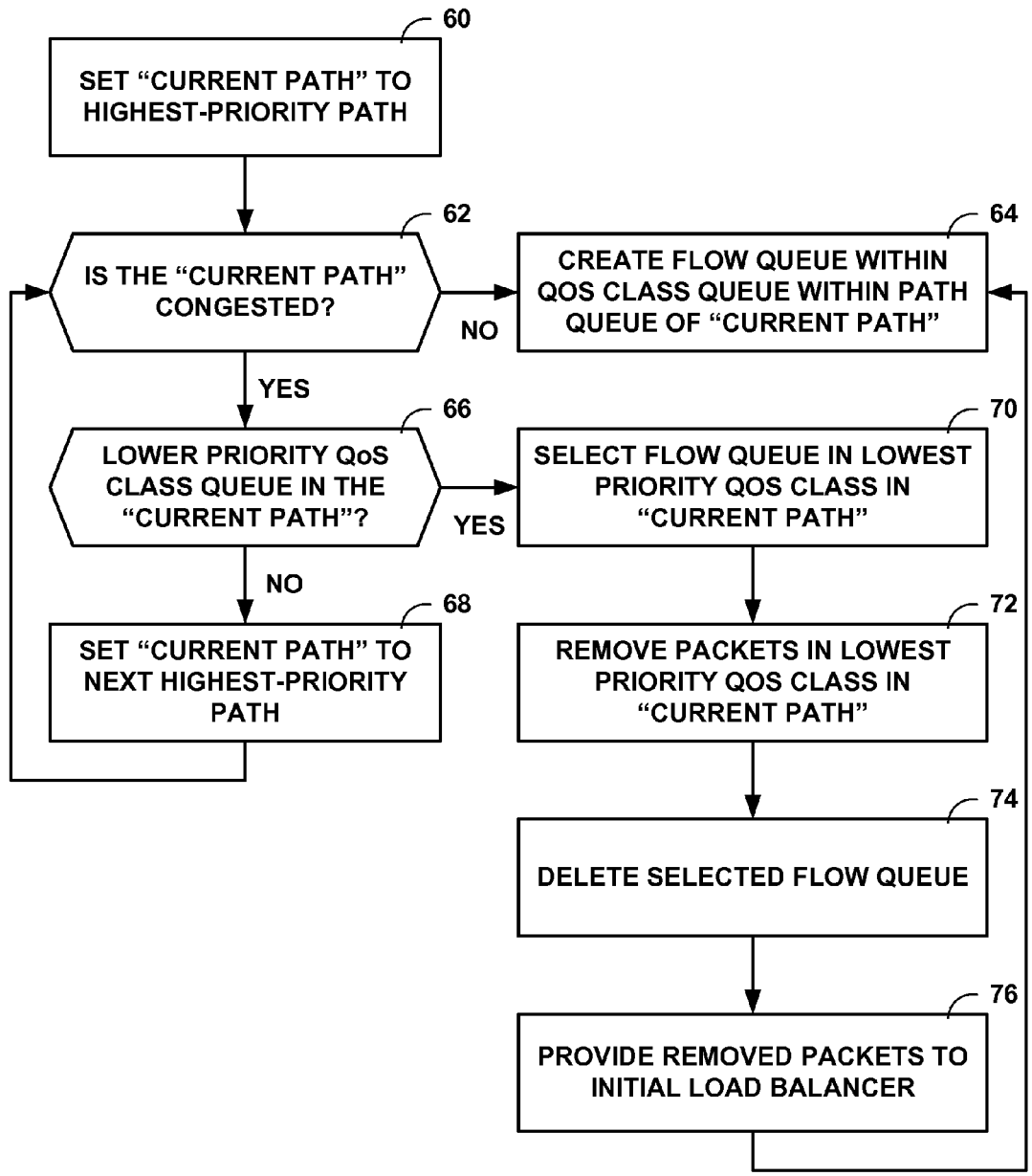
FIG. 5 is a flowchart illustrating an exemplary queue creation operation of an initial load balancer when a MPLB is configured with prioritized multi-paths and QoS is configured.

FIG. 5 is a flowchart illustrating an exemplary queue creation operation of initial load balancer 32 when MPLB 24 is configured with prioritized multi-paths and QoS is enabled. In terms of FIG. 3, FIG. 5 represents an exemplary operation of initial load balancer 32 in step (46) when MPLB 24 is configured with prioritized multi-paths and QoS is configured.

Initial load balancer 32 starts this process by setting the "current path" to the highest-priority one of paths 16 (i.e., the primary path) (60). Initial load balancer 32 then determines whether the "current path" is congested (62). If the "current path" is not congested ("NO" of 62), initial load balancer 32 uses the flow information of the current network packet to create a new flow queue within the QoS class queue within the path queue of the "current path" (64). On the other hand, if the "current path" is congested ("YES" of 62), initial load balancer 32 determines whether there is a QoS class queue in the path queue of the "current path" that has lower priority than the QoS class described in the flow information of the current network packet (66). If there is no such lower-priority QoS class queue ("NO" of 66), initial load balancer 32 sets the "current path" to the next highest-priority path (68). Initial load balancer 32 then determines whether this "current path" is congested, and the process repeats (62).

If there is a lower-priority QoS class queue ("YES" of 66), initial load balancer 32 selects a flow queue within the lowest priority QoS class queue within the path queue of "current path" (70). After selecting the flow queue, initial load balancer 32 removes the network packets from this flow queue (72). Initial load balancer 32 then deletes the selected flow queue from queue structure 26 (74). Next, initial load balancer 32 provides the removed network packets to itself (initial load balancer 32) as new network packets, as in FIG. 3 (76). After providing the removed network packets to itself, initial load balancer 32 uses the flow information of the current network packet to create a new flow queue within the QoS class within the path queue of "current path" (64).

Figure 6:
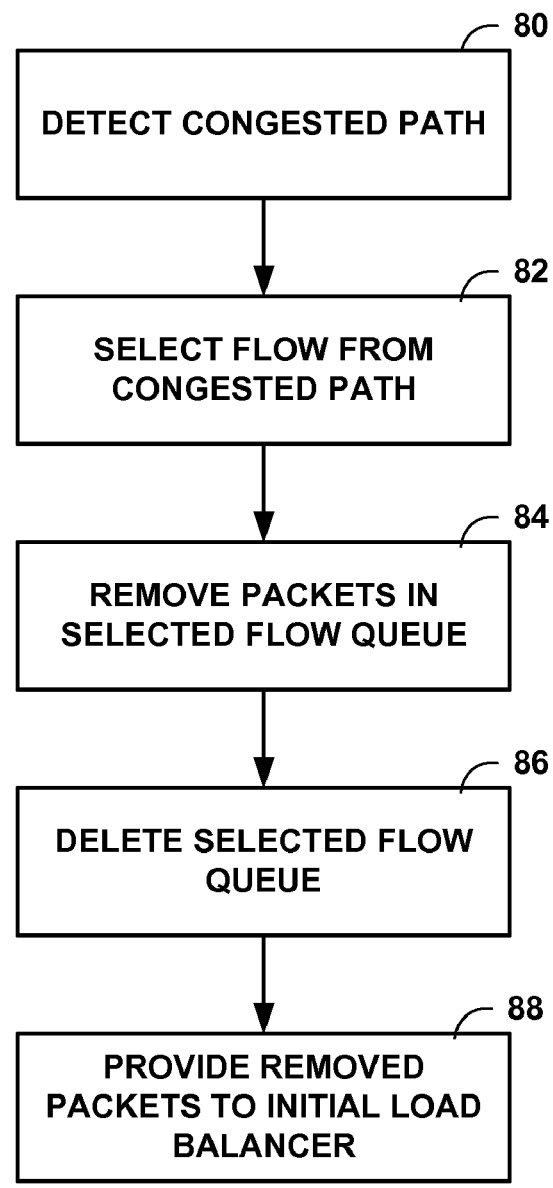
FIG. 6 is a flowchart illustrating an exemplary operation of a load rebalancer when a MPLB is configured with prioritized multi-paths and QoS is not enabled.

FIG. 6 is a flowchart illustrating an exemplary operation of load rebalancer 34 when MPLB 24 is configured with prioritized multi-paths and QoS is not enabled. Initially, load rebalancer 34 detects that one of paths 16 is congested (80). After detecting the congested path, load rebalancer 34 selects a flow queue within the path queue of the congested path in queue structure 26 (82). Load rebalancer 34 then removes the network packets in the selected flow queue (84). Once load rebalancer 34 has removed the network packets, load rebalancer 34 deletes the selected flow queue from queue structure 26 (86). Load rebalancer 34 may then provide the removed network packets to initial load balancer 32 as new packets (88). Subsequently, initial load balancer 32 may assign the flow of these network packets to a less congested one of paths 16.

Figure 7:
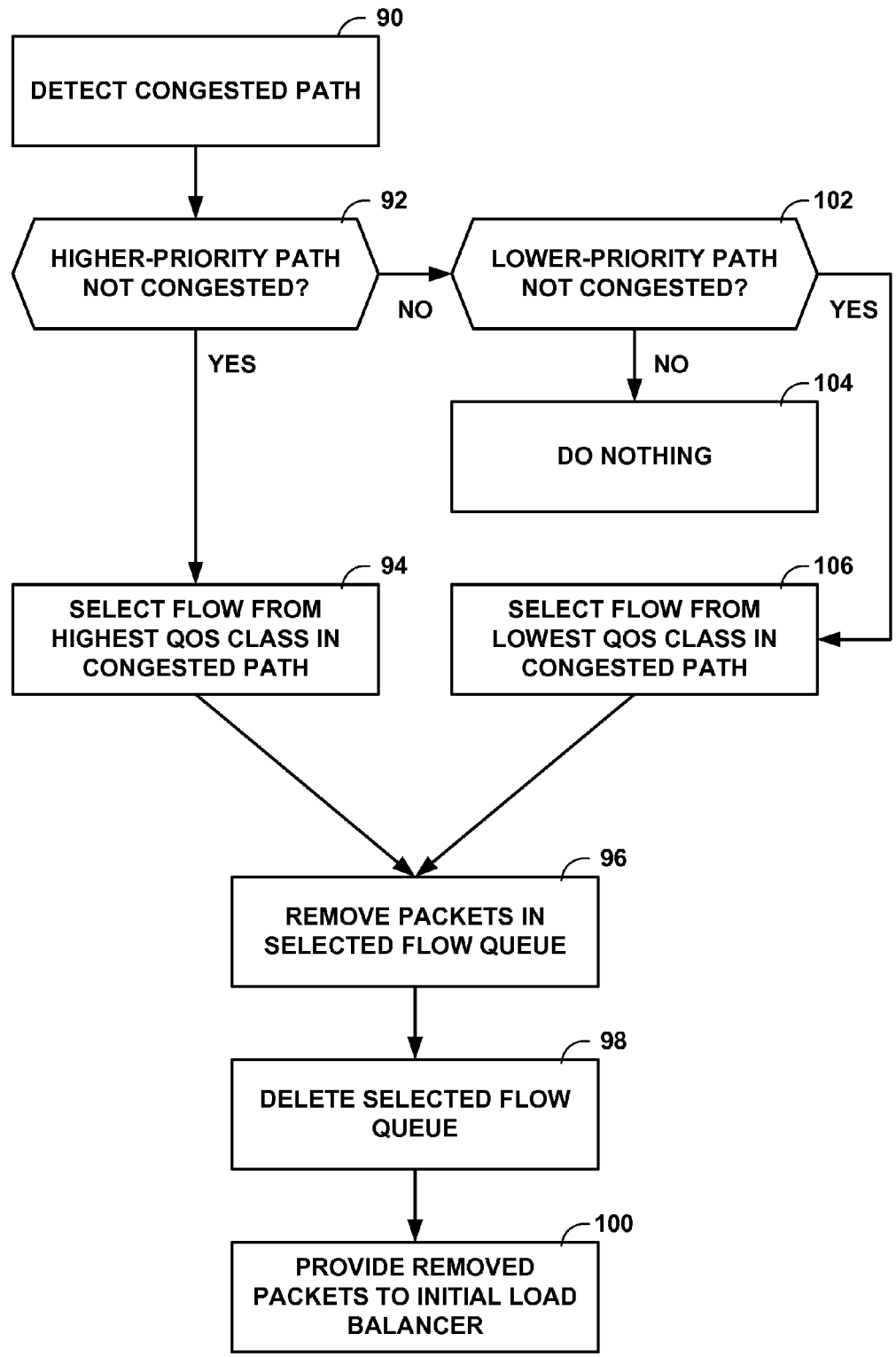
FIG. 7 is a flowchart illustrating an exemplary operation of a load rebalancer when a MPLB is configured with prioritized multi-paths and QoS is enabled.

FIG. 7 is a flowchart illustrating an exemplary operation of load rebalancer 34 when MPLB 24 is configured with prioritized multi-paths and QoS is enabled. Initially, load rebalancer 34 detects that one of paths 16 is congested (90). After detecting the congested path, load rebalancer 34 determines whether there is a higher-priority path than the congested path that is not congested (92).

If there is a higher-priority path that is not congested ("YES" of 92), load rebalancer 34 selects a flow from the highest QoS class in the congested path (94). Load rebalancer 34 then removes network packets in the selected flow (95), deletes the selected flow queue from queue structure 26, and provides the removed network packets to initial load balancer 32 as new network packets (96).

On the other hand, if there is no higher-priority path that is not congested ("NO" of 92), load rebalancer 34 determines whether there is a lower-priority path than the congested path that is not congested (102). If there is no lower-priority path that is not congested ("NO" of 102), load rebalancer 34 does nothing (104). However, if there is a lower-priority path that is not congested ("YES" of 102), load rebalancer 34 selects a flow from the lowest QoS class in the congested path (106). Load rebalancer 34 then removes packets in the selected flow (96), deletes the selected flow queue from queue structure 26 (98), and provides the removed packets to initial load balancer 32 as new packets (100).

Figure 8:
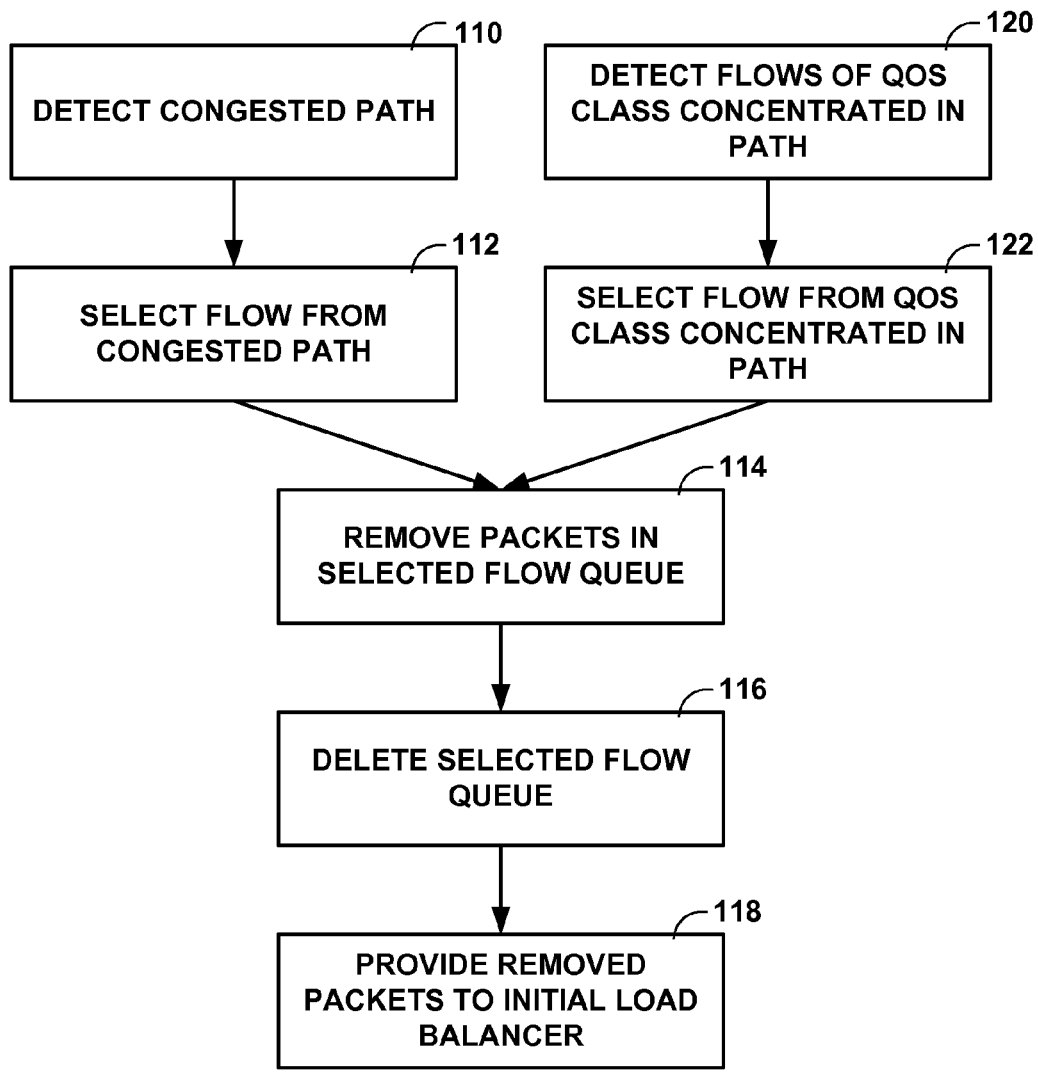
FIG. 8 is a flowchart illustrating an exemplary operation of a load rebalancer when a MPLB is configured with symmetric multi-paths and QoS is enabled.

FIG. 8 is a flowchart illustrating an exemplary operation of load rebalancer 34 when MPLB 24 is configured with symmetric multi-paths and QoS is enabled. Initially, load rebalancer 34 may detect that one of paths 16 is congested (110). After detecting the congested path, load rebalancer 34 selects a flow queue in the congested path (112). Load rebalancer 34 then removes the network packets in the selected flow (114), deletes the selected flow queue from queue structure 26 (116), and provides the removed network packets to initial load balancer 32 as new packets (118).

In addition, load rebalancer 34 may detect that flows of one QoS class are concentrated in one of multi-paths 16 (120). In this case, load rebalancer 34 selects a flow queue in the QoS class that is concentrated in the path (122). Load rebalancer 34 then removes network packets in the selected flow (114), deletes the selected flow queue from queue structure 26 (116), and provides the removed network packets to initial load balancer 32 as new packets (118).

Various embodiments of the invention have been described. However, these embodiments are not intended to represent all possible embodiments of this invention. Many other embodiments are possible. For example, initial load balancer 32 may use a hashing process to accelerate the flow information extraction and comparison process. Furthermore, MPLB 24 could utilize some other means of organizing network packets rather than a queue structure. These and other embodiments are within the scope of the following claims.

The invention claimed is:

1. A computer-implemented method comprising:
   dynamically assigning incoming flows of network packets to network paths in a plurality of network paths to a destination, wherein the incoming flows of network packets are assigned such that the network paths have sufficient available bandwidth to satisfy Quality of Service (QoS) bandwidth requirements associated with the incoming flows, and wherein the incoming flows are load balanced among the network paths;
   forwarding the network packets of the incoming flows along the assigned network paths such that the QoS bandwidth requirements associated with the flows are satisfied;
   selecting a flow assigned to one of the network paths when the network path does not have sufficient available bandwidth to satisfy a QoS bandwidth requirement associated with one of the flows assigned to the network path;
   un-assigning the selected flow from the network paths; and
   maintaining a queue structure to hold a hierarchy of network packet queues,
      wherein the queue structure comprises one or more destination queues to contain all unsent network packets awaiting transmission to a destination,
      wherein a destination queue in the queue structure for a destination comprises one or more path queues to contain all unsent network packets awaiting transmission to the destination via a network path,
      wherein a path queue in the queue structure for a network path comprises one or more QoS class queues to contain all unsent network packets awaiting transmission to the destination via the network path that belong to a QoS class, and
      wherein a QoS class queue in the queue structure of a QoS class comprises one or more flow queues to contain all unsent network packets awaiting transmission to the destination via the network path that belong to the QoS class and that belong to a network flow.

2. The method of claim 1,
   wherein a first path in the plurality of network paths is a path through a public network; and
   wherein a second path in the plurality of network paths is a path through a private network.

3. The method of claim 1, wherein dynamically assigning incoming flows comprises:
   dynamically measuring a bandwidth for each network path in the plurality of network paths; and
   dynamically measuring a load for each flow on the plurality of network paths.

4. The method of claim 3, wherein dynamically measuring a bandwidth comprises sending bandwidth discovery packets along each of the paths.

5. The method of claim 3, wherein dynamically measuring a bandwidth comprises sending packets according to a congestion control algorithm.

6. The method of claim 5, wherein the congestion control algorithm comprises a Transmission Control Protocol (TCP) Vegas algorithm.

7. The method of claim 3, wherein dynamically measuring a load for each flow comprises determining a moving average for each of the flows.

8. The method of claim 1, wherein each of the network paths is associated with a well-ordered priority.

9. The method of claim 8, further comprising:
   selecting a highest priority network path and determining whether the selected network path has bandwidth sufficient to satisfy the QoS requirements of the incoming flow;
   upon determining that the selected network path does not have bandwidth sufficient to satisfy the QoS requirements of the incoming flow, selecting from the identified network path a network flow having a lower QoS priority than a QoS priority of the incoming flow;
   un-assigning the selected flow from the identified network path; and
   dynamically assigning the incoming flow to the identified network path.

10. The method of claim 8, wherein selecting a flow comprises selecting a flow when the flow has a highest QoS priority in the path and there is a higher-priority path that is not congested and has bandwidth sufficient to satisfy the QoS requirements of the incoming flow.

11. The method of claim 8, wherein selecting a flow comprises selecting a flow when the flow has a lowest QoS priority in the path and there is a lower-priority path that is not congested and has bandwidth sufficient to satisfy the QoS requirements of the incoming flow.

12. The method of claim 1, wherein each of the network paths has the same priority.

13. The method of claim 12, wherein dynamically assigning incoming flows comprises assigning one of the incoming flows to a network path in the plurality of network paths when the network path has less load than other network paths in the plurality of network paths, in proportion to bandwidths of the paths, caused by network flows in a same QoS class as a QoS class of the new flow.

14. The method of claim 12, wherein selecting a flow comprises selecting a flow of a QoS class when a network path has been assigned a concentration of flows of the QoS class that is not in proportion with the bandwidth of the network path.

15. The method of claim 1, wherein dynamically assigning an incoming flow comprises creating a flow queue in the queue structure within a destination queue of the incoming flow, a path queue of the network path, and a QoS class queue of the incoming flow.

16. The method of claim 1, wherein un-assigning the selected flow comprises deleting the flow queue of the selected flow from the queue structure.

17. A network device comprising:
- an initial load balancer to dynamically assign incoming flows of network packets to network paths in a plurality of network paths to a destination, wherein the initial load balancer assigns the incoming flows such that the network paths have sufficient available bandwidth to satisfy Quality of Service (QoS) bandwidth requirements associated with the incoming flows, and wherein the incoming flows are load balanced among the network paths;
- a load rebalancer to select a flow assigned to one of the network paths when the network path does not have sufficient available bandwidth to satisfy a QoS bandwidth requirement associated with the flow and to un-assign the selected flow from the network path;
- a packet scheduler to send the network packets of the incoming flows to the destination via the assigned network paths, such that the QoS requirements associated with the flows are satisfied; and
- a queue structure to hold a hierarchy of network packet queues,
  - wherein the queue structure comprises one or more destination queues to contain all unsent network packets awaiting transmission to a destination,
  - wherein a destination queue in the queue structure for a destination comprises one or more path queues to contain all unsent network packets awaiting transmission to the destination via a network path,
  - wherein a path queue in the queue structure for a network path comprises one or more QoS class queues to contain all unsent network packets awaiting transmission to the destination via the network path that belong to a QoS class, and
  - wherein a QoS class queue in the queue structure of a QoS class comprises one or more flow queues to contain all unsent network packets awaiting transmission to the destination via the network path that belong to the QoS class and that belong to a network flow.

18. The network device of claim 17,
wherein a first path in the plurality of network paths is a path through a public network; and
wherein a second path in the plurality of network paths is a path through a private network.

19. The network device of claim 17, further comprising:
a bandwidth measurement module to dynamically measure a bandwidth for each network path in the plurality of network paths; and
a load measurement module to dynamically measure a load for each flow on the plurality of network paths.

20. The network device of claim 19, wherein the bandwidth measurement module dynamically measures a bandwidth by sending bandwidth discovery packets along each of the paths.

21. The network device of claim 19, wherein the bandwidth measurement module dynamically measures a bandwidth by sending network packets according a congestion control algorithm.

22. The network device of claim 21, wherein the congestion control algorithm comprises a Transmission Control Protocol (TCP) Vegas algorithm.

23. The network device of claim 19, wherein the load measurement module measures a load of a flow in the plurality of network paths by determining a moving average load for the flow.

24. The network device of claim 17, wherein each of the network paths is associated with a well-ordered priority.

25. The network device of claim 24,
wherein, when assigning an incoming flow to the network paths the initial load balancer selects a highest priority network path and determines whether the selected path has bandwidth sufficient to satisfy the QoS requirements of the incoming flow,
wherein, upon determining that the selected network path does not have bandwidth sufficient to satisfy the QoS requirements of the incoming flow, the initial load balancer determines whether the identified network path has a network flow having a lower QoS priority than a QoS priority of the incoming flow, and
wherein, upon determining the network flow, the load balancer un-assigns the determined flow from the network path and dynamically assigns the incoming flow to the network path.

26. The network device of claim 24, wherein the load rebalancer selects the flow when the flow has a highest QoS priority in the network path and there is a higher-priority path that is not congested and has bandwidth sufficient to satisfy the QoS requirements of the incoming flow.

27. The network device of claim 24, wherein the load rebalancer selects the flow when the flow has a lowest QoS priority in the network path and there is a lower-priority network path that is not congested and has bandwidth sufficient to satisfy the QoS requirements of the incoming flow.

28. The network device of claim 17, wherein each of the network paths has the same priority.

29. The network device of claim 28, wherein the initial load balancer assigns one of the incoming network flows to a network path in the plurality of network paths when the network path has less load, proportionally, than other network paths in the plurality of paths.

30. The network device of claim 28, wherein the load rebalancer selects a flow of a QoS class when a path includes a concentration of flows of the QoS class that is not in proportion with the bandwidth of the network path.

31. The network device of claim 17, wherein the initial load balancer assigns the incoming flow to a network path by creating a flow queue in the queue structure within a destination queue of the incoming flow, a path queue of the network path, and a QoS class queue of the incoming flow.

32. The network device of claim 17, wherein the load rebalancer un-assigns the selected flow from a network path by deleting the flow queue of the selected now from the queue structure.

33. A computer-readable medium comprising instructions, the instructions causing a programmable processor to:
dynamically assign incoming flows of network packets to network paths in a plurality of network paths to a destination, wherein the incoming flows of network packets are assigned such that the network paths have sufficient available bandwidth to satisfy Quality of Service (QoS) bandwidth requirements associated with the incoming flows, and wherein the incoming flows are load balanced among the network paths;
forward the network packets of the incoming flows along the assigned network paths such that the QoS bandwidth requirements associated with the flows are satisfied;
select a flow assigned to one of the network paths when the network path does not have sufficient available bandwidth to satisfy a QoS bandwidth requirement associated with a flow assigned to the network path;
un-assign the selected flow from the network paths; and maintain a queue structure to hold a hierarchy of network packet queues,
- wherein the queue structure comprises one or more destination queues to contain all unsent network packets awaiting transmission to a destination,
- wherein a destination queue in the queue structure for a destination comprises one or more path queues to contain all unsent network packets awaiting transmission to the destination via a network path,
- wherein a path queue in the queue structure for a network path comprises one or more QoS class queues to contain all unsent network packets awaiting transmission to the destination via the network path that belong to a QoS class, and
- wherein a QoS class queue in the queue structure of a QoS class comprises one or more flow queues to contain all unsent network packets awaiting transmission to the destination via the network path that belong to the QoS class and that belong to a network flow.

34. The computer-readable medium of claim 33,
- wherein a first path in the plurality of network paths is a path through a public network; and
- wherein a second path in the plurality of network paths is a path through a private network.

35. The computer-readable medium of claim 33, wherein each of the network paths is associated with a well-ordered priority.

36. The computer-readable medium of claim 33, wherein each of the network paths has the same priority.

* * * * *

UNITED STATES PATENT AND TRADEMARK OFFICE
CERTIFICATE OF CORRECTION

PATENT NO. : 7,583,677 B1
APPLICATION NO. : 11/556498
DATED : September 1, 2009
INVENTOR(S) : Qingming Ma and Anupam A. Bharali It is certified that error appears in the above-identified patent and that said Letters Patent is hereby corrected as shown below:

On Column 13, line 59, "according a congestion" should read -- according to a congestion --.

On Column 14, line 48, "selected now from" should read -- selected flow from --.

Signed and Sealed this

Twentieth Day of July, 2010

David J. Kappos
*Director of the United States Patent and Trademark Office*